United States Patent
Banffy

(10) Patent No.: US 12,321,748 B2
(45) Date of Patent: Jun. 3, 2025

(54) CENTRAL PROCESSING UNIT (CPU) INSTRUCTION FLOW OPTIMIZATION BASED ON PERFORMANCE-EFFICIENCY CLASSIFICATIONS FOR CPU INSTRUCTIONS

(71) Applicant: HONEYWELL INTERNATIONAL INC., Charlotte, NC (US)

(72) Inventor: Ricardo Banffy, Dublin (IE)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 133 days.

(21) Appl. No.: 18/362,016

(22) Filed: Jul. 31, 2023

(65) Prior Publication Data
US 2025/0045053 A1    Feb. 6, 2025

(51) Int. Cl.
G06F 9/30 (2018.01)
G06F 11/34 (2006.01)

(52) U.S. Cl.
CPC ...... *G06F 9/30145* (2013.01); *G06F 11/3466* (2013.01)

(58) Field of Classification Search
CPC .......... G06F 9/30145; G06F 11/3466
See application file for complete search history.

(56) References Cited

U.S. PATENT DOCUMENTS

| | | | |
|---|---|---|---|
| 7,292,531 B1 * | 11/2007 | Hill | H04L 43/0882 370/230.1 |
| 9,779,364 B1 * | 10/2017 | Hoover | G06Q 30/0206 |
| 2004/0034757 A1 * | 2/2004 | Gochman | G06F 9/30145 711/219 |
| 2006/0184776 A1 * | 8/2006 | Bishop | G06F 11/349 714/E11.2 |
| 2014/0325481 A1 * | 10/2014 | Pillai | G06F 11/3003 717/124 |

* cited by examiner

*Primary Examiner* — Zachary K Huson
(74) *Attorney, Agent, or Firm* — Alston & Bird LLP

(57) ABSTRACT

Various embodiments relate to optimizing central processing unit (CPU) instruction flows based on performance-efficiency classifications for CPU instructions. In an implementation, a performance-efficiency classification for a CPU instruction is determined based on an instruction dependency between the CPU instruction and one or more other CPU instructions. Additionally, a particular execution unit from a set of execution units that comprises a defined performance-efficiency classification corresponding to the performance-efficiency classification associated with the CPU instruction is determined and/or execution of the CPU instruction via the particular execution unit is caused.

20 Claims, 8 Drawing Sheets

CENTRAL PROCESSING UNIT (CPU) INSTRUCTION FLOW OPTIMIZATION BASED ON PERFORMANCE-EFFICIENCY CLASSIFICATIONS FOR CPU INSTRUCTIONS

TECHNICAL FIELD

The present disclosure generally relates to embedded computing, and more particularly to a processing unit architecture for processing instructions.

BACKGROUND

A central processing unit typically utilizes execution units to process instructions fetched from memory. However, through applied effort, ingenuity, and innovation, performance deficiencies and problems related to typical central processing units have been solved by developing solutions that are configured in accordance with the embodiments of the present disclosure, many examples of which are described in detail herein.

SUMMARY

The details of some embodiments of the subject matter described in this specification are set forth in the accompanying drawings and the description below. Other features, aspects, and advantages of the subject matter will become apparent from the description, the drawings, and the claims.

In an embodiment, a system includes one or more processors and a memory that stores one or more programs. In one or more embodiments, the one or more programs include instructions configured to determine a performance-efficiency classification for a central processing unit (CPU) instruction based on an instruction dependency between the CPU instruction and one or more other CPU instructions. In one or more embodiments, the instruction dependency is based on a number of CPU instructions in an instruction workflow between the CPU instruction and the one or more other CPU instructions. In one or more embodiments, the one or more programs additionally or alternatively include instructions configured to determine a particular execution unit from a set of execution units that comprises a defined performance-efficiency classification corresponding to the performance-efficiency classification associated with the CPU instruction. In one or more embodiments, the one or more programs additionally or alternatively include instructions configured to cause execution of the CPU instruction via the particular execution unit.

In another embodiment, a computer-implemented method is provided. The computer-implemented method provides for determining a performance-efficiency classification for a CPU instruction based on an instruction dependency between the CPU instruction and one or more other CPU instructions, determining a particular execution unit from a set of execution units that comprises a defined performance-efficiency classification corresponding to the performance-efficiency classification associated with the CPU instruction, and/or causing execution of the CPU instruction via the particular execution unit. In one or more embodiments, the instruction dependency is based on a number of CPU instructions in an instruction workflow between the CPU instruction and the one or more other CPU instructions.

In yet another embodiment, a computer program product includes at least one computer-readable storage medium having program instructions embodied thereon. In one or more embodiments, the program instructions are executable by a processor to cause the processor to determine a performance-efficiency classification for a CPU instruction based on an instruction dependency between the CPU instruction and one or more other CPU instructions. In one or more embodiments, the instruction dependency is based on a number of CPU instructions in an instruction workflow between the CPU instruction and the one or more other CPU instructions. In one or more embodiments, the program instructions are additionally or alternatively executable by the processor to cause the processor to determine a particular execution unit from a set of execution units that comprises a defined performance-efficiency classification corresponding to the performance-efficiency classification associated with the CPU instruction. In one or more embodiments, the program instructions are additionally or alternatively executable by the processor to cause the processor to cause execution of the CPU instruction via the particular execution unit.

BRIEF DESCRIPTIONS OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
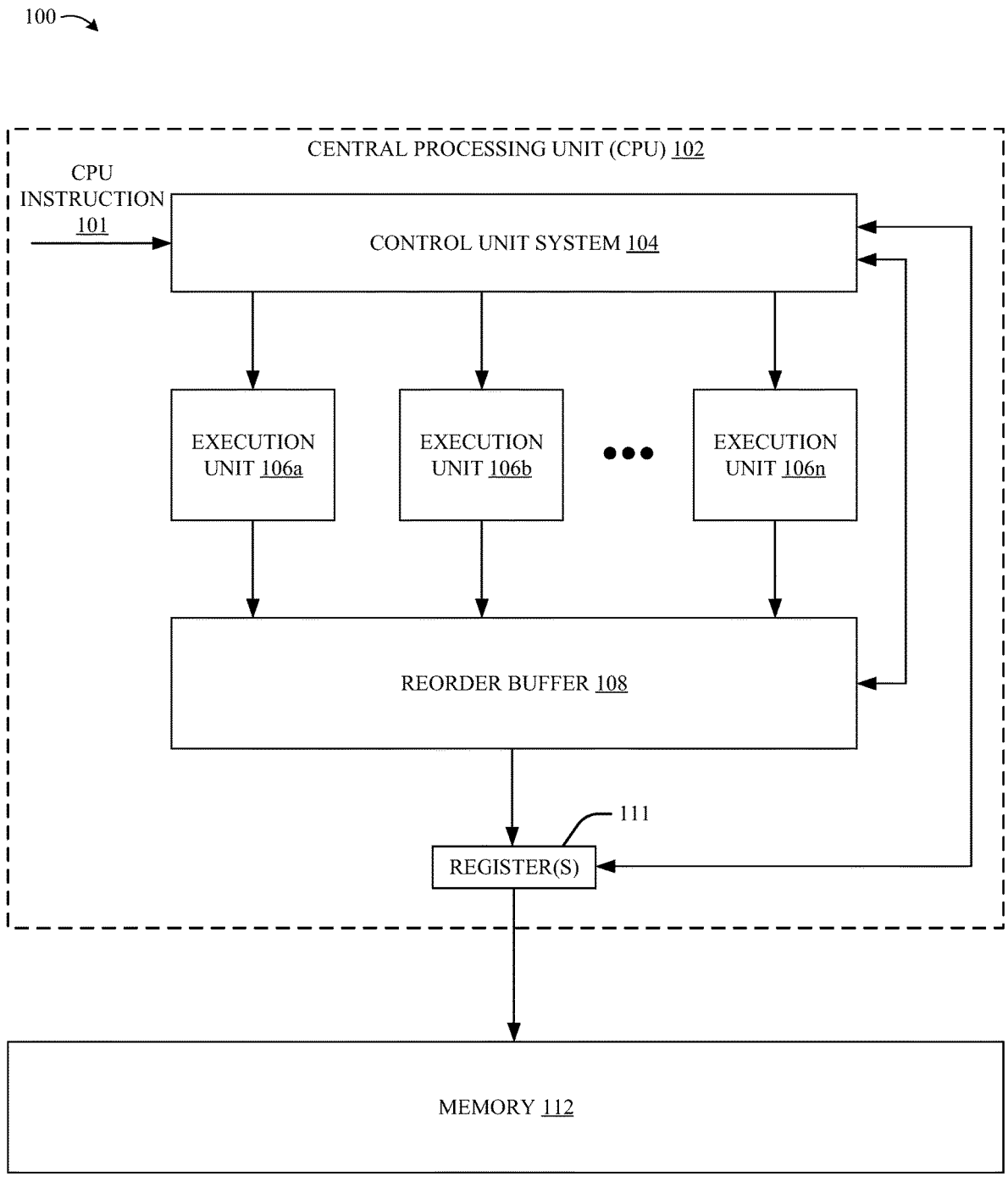
FIG. 1 illustrates an exemplary central processing unit (CPU), in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

A central processing unit (CPU) typically utilizes execution units to process instructions fetched from memory. However, processing of instructions via traditional CPUs may result in performance inefficiencies. For example, scheduling of decoded instructions for processing by execution units via traditional CPUs may result in inefficient power consumption for a CPU, memory access bottlenecks for instructions, instruction pipeline stalls, reduced processing speed for a CPU, and/or other inefficiencies for a CPU.

Thus, to address these and/or other issues, various embodiments of the present disclosure relate to computer-implemented methods, systems, and computer-program products directed to optimizing CPU instruction flows based on performance-efficiency classifications for CPU instructions. By optimizing CPU instruction flows, power efficiency and/or performance of a CPU can be increased. In various embodiments, decoded instructions in a CPU are scheduled for execution via one or more performance execution units and/or one or more efficiency execution units based on dependency information provided at an output of a reorder buffer. For example, instruction dependencies in an instruction flow can be utilized to schedule instructions with no immediate dependent instructions to a slower but more power efficient execution unit (e.g., an efficiency execution unit) as compared to a faster but more power inefficient execution unit (e.g., a performance execution unit). In various embodiments, a performance core can be implemented in combination with an efficiency core by varying a number of performance execution units and/or a number of efficiency execution units based on performance-efficiency classifications for CPU instructions. In various embodiments, behavior and/or power profiles for performance execution units and efficiency execution units can be altered based on performance-efficiency classifications for CPU instructions. As such, CPU instructions with greater workloads can be executed via one or more performance execution units and CPU instructions with lesser workloads can be executed via one or more efficiency execution units.

In various embodiments, a CPU is dynamically tuned based on performance-efficiency classifications for CPU instructions. For example, in various embodiments, a number of virtual cores of the CPU can be dynamically altered based on performance-efficiency classifications for CPU instructions. As such CPU utilization can also be increased based on workload characteristics of CPU instructions and/or occupancy of execution units. A speed of processing and/or throughput for CPU instructions can additionally or alternatively be increased.

In various embodiments, a virtual core identifier can be correlated to a CPU instruction in a reorder buffer to facilitate dynamic alteration of a number of virtual cores of the CPU. For example, a virtual core identifier can be added to a status indication for a CPU instruction stored in a reorder buffer to facilitate identification of instruction dependencies for virtual cores. In various embodiments, a register can be selected and/or a register file can be configured based on a virtual core identifier for respective CPU instructions. Accordingly, a single reorder buffer can receive CPU instructions from multiple virtual cores and/or can share a corresponding set of execution units. In various embodiments, a performance counter can be utilized to assess execution unit occupancy (e.g., how many of the execution units spent a clock cycle processing CPU instruction data over a certain time span). A performance counter can be additionally or alternatively utilized to dynamically add or remove virtual cores to a CPU (e.g., in cooperation with an operating system scheduler for the CPU).

As such, by employing one or more techniques related to optimizing CPU instruction flows as disclosed herein, various technical improvements can be achieved. For example, by employing one or more techniques related to optimizing CPU instruction flows as disclosed herein, power consumption for a CPU can be improved, memory access bottlenecks for CPU instructions can be minimized, CPU instruction pipeline stalls can be minimized, and/or processing speed for a CPU can be improved. Moreover, a number of computing resources and/or a number of errors for processing CPU instructions can be reduced by employing one or more techniques for optimizing CPU instructions flows as disclosed herein.

FIG. 1 illustrates a system 100 that provides another exemplary environment according to one or more described features of one or more embodiments of the disclosure. According to one or more embodiments, the system 100 includes a central processing unit (CPU) 102. The CPU 102 can be an embedded processor, a high-power processor, a special-purpose processor, a custom core processor, a hybrid CPU, an artificial intelligence accelerator processor, an application specific integrated circuit (ASIC), a field programmable gate array (FPGA), or another type of processor. The CPU 102 includes a control unit system 104, a set of execution units 106*a*-*n*, a reorder buffer 108, and/or one or more registers 111.

In one or more embodiments, the control unit system 104 determines and/or receives a CPU instruction 101. The CPU instruction 101 is an executable instruction (e.g., a program instruction) capable of being executed by the CPU 102. In one or more embodiment, the CPU instruction 101 is executable instruction (e.g., a program instruction) capable of being executed by one or more executable units of the set of execution units 106*a*-*n*. In certain embodiments, the CPU instruction 101 can be formatted as a reduced instruction set computer (RISC) instruction. For example, in certain embodiments, the CPU instruction 101 can be a RISC-V instruction. The CPU instruction 101 can be fetched from memory 112 and/or can be a decoded CPU instruction that is decoded by the control unit system 104 or another component of the CPU 102. In one or more embodiments, the CPU instruction 101 is fetched from the reorder buffer 108. For example, the CPU instruction 101 can be initially fetched from the memory 112 and temporarily stored in the reorder buffer 108 until being dispatched to an execution unit from the set of execution units 106a-n by the control unit system 104.

The memory 112 can be communicatively coupled to the CPU 102. In various embodiments, the memory 112 is a computer-readable storage medium configured to store CPU instructions. The memory 112 can be an electronic storage device (e.g., a computer-readable storage medium) configured to store CPU instructions and/or other data to enable the CPU 102 to carry out various functions in accordance with one or more embodiments disclosed herein. In one or more embodiments, the memory 112 includes one or more volatile memories and/or one or more non-volatile memories. For example, the memory 112 can be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, ROM, PROM, EPROM, EEPROM, flash memory, MMCs, SD memory cards, Memory Sticks, CBRAM, PRAM, FeRAM, RRAM, SONOS, racetrack memory, and/or another type of memory.

In one or more embodiments, the control unit system 104 determines a performance-efficiency classification for the CPU instruction 101. For example, in one or more embodiments, the control unit system 104 determines a performance-efficiency classification for the CPU instruction 101 based on an instruction dependency between the CPU instruction 101 and one or more other CPU instructions. The one or more other CPU instructions can be stored in the memory 112 and/or can be associated with an instruction flow that includes the CPU instruction 101. An instruction flow can include fetching of one or more CPU instructions from the memory 112, decoding the one or more CPU instructions, executing the one or more CPU instructions via the set of execution units 106a-n, and/or storing a result of the execution in the one or more registers 111 or the memory 112. In one or more embodiments, the instruction flow can execute CPU instructions in parallel via the set of execution units 106a-n.

In one or more embodiments, a respective execution unit from the set of execution units 106a-n is respectively configured for a certain degree of performance or efficiency. For example, a first execution unit from the set of execution units 106a-n can be configured with a first size and/or a first clock speed (e.g., a first clock frequency) to provide a first degree of performance. Additionally, a second execution unit from the set of execution units 106a-n can be configured with a second size and/or a second clock speed (e.g., a second clock frequency) to provide a second degree of performance. In a non-limiting example, a first execution unit from the set of execution units 106a-n can be configured as a performance execution unit associated with a performance processing core and second execution unit from the set of execution units 106a-n can be configured as an efficiency execution unit associated with an efficiency processing core.

In one or more embodiments, the performance-efficiency classification is a classification that indicates a degree of desirable performance or efficiency for an execution unit from the set of execution units 106a-n to execute the CPU instruction 101. For example, the performance-efficiency classification can be related to a predicted workload for executing the CPU instruction 101 such that the CPU instruction 101 with a greater predicted workload can be executed by a particular execution unit from the set of execution units 106a-n with greater performance capability and the CPU instruction 101 with a lesser predicted workload can be executed by a particular execution unit from the set of execution units 106a-n with lesser performance capability for greater efficiency.

In one or more embodiments, the instruction dependency is determined based on output data provided by the reorder buffer 108. For example, the instruction dependency can be determined based on a respective result for one or more other CPU instructions previously executed via the set of execution units 106a-n and/or one or more other CPU instructions related to an instruction workflow for the CPU instruction 101. Additionally or alternatively, in one or more embodiments, the instruction dependency is determined based on an instruction flow associated with the CPU instruction 101. For example, the reorder buffer 108 can store an instruction flow that includes a stream of instructions to be executed via the set of execution units 106a-n. As such, the instruction dependency can be based on a location of the CPU instruction 101 with respect to one or more other CPU instructions in the instruction flow that depend on the CPU instruction 101.

In one or more embodiments, the instruction dependency is based on a number of CPU instructions in an instruction workflow between the CPU instruction and the one or more other CPU instructions. For example, the control unit system 104 can analyze the output data provided by the reorder buffer 108 and/or the instruction flow associated with the CPU instruction 101 to determine a number of CPU instructions in the instruction workflow between the CPU instruction and the one or more other CPU instructions.

In one or more embodiments, the control unit system 104 determines a particular execution unit from the set of execution units 106a-n that includes a defined performance-efficiency classification corresponding to the performance-efficiency classification associated with the CPU instruction 101. For example, the defined performance-efficiency classification can be a defined performance classification, a defined efficiency classification, or another type of classification related to a certain degree of performance/efficiency for execution of instructions.

In one or more embodiments, the control unit system 104 determines the performance-efficiency classification for the CPU instruction 101 based on a comparison between the number of CPU instructions and a threshold number of CPU instructions. The threshold number of CPU instructions can be a defined number of CPU instructions that differentiates a performance classification and an efficiency classification for CPU instructions. For example, in response to the number of CPU instructions satisfying (e.g., being equal to or higher than) the threshold number of CPU instructions, the performance-efficiency classification for the CPU instruction 101 can correspond to an efficiency classification where the CPU instruction 101 can be scheduled for execution via an efficiency execution unit of the set of execution units 106a-n. In another example, in response to the number of CPU instructions not satisfying (e.g., being less than) the threshold number of CPU instructions, the performance-efficiency classification for the CPU instruction 101 can correspond to a performance classification where the CPU instruction 101 can be scheduled for execution via a performance execution unit of the set of execution units 106*a-n*.

In one or more embodiments, the control unit system 104 dynamically tunes one or more execution units from the set of execution units 106*a-n* based on the performance-efficiency classification associated with the CPU instruction 101. For example, in certain embodiments, the control unit system 104 additionally or alternatively dynamically tunes real-time performance and/or workload (e.g., workload characteristics) of the set of execution units 106*a-n* by scheduling execution of the CPU instruction 101 and/or one or more other CPU instructions based on the performance-efficiency classification associated with the CPU instruction 101.

In one or more embodiments, the control unit system 104 additionally or alternatively determines the particular execution unit from the set of execution units 106*a-n* based on a virtual core identifier for the CPU instruction 101. In one or more embodiments, the virtual core identifier is stored in the reorder buffer 108. For example, a status indicator, metadata, and/or a header for the CPU instruction 101 can be augmented with a virtual core identifier prior to being fetched by the control unit system 104. The virtual core identifier can identify a particular type of virtual core (e.g., a performance core or an efficiency core) for the CPU instruction 101. In certain embodiments, respective lines in the reorder buffer 108 that represent respective CPU instructions can include one or more bits to identify a potential virtual core for the respective PU instructions. For example, the reorder buffer 108 can store and/or correlate the virtual core identifier to the CPU instruction 101 to facilitate execution unit decisions for the CPU instruction 101.

In one or more embodiments, the control unit system 104 additionally or alternatively determines the particular execution unit from the set of execution units 106*a-n* based on a respective performance counter for the set of execution units 106*a-n*. For example, a performance counter can be utilized for each of the execution units of the set of execution units 106*a-n* to track workload, temperature characteristics, and/or a number of virtual cores related to each of the execution units. In one or more embodiments, CPU instructions can be scheduled for particular execution units from the set of execution units 106*a-n* based on a respective counter. As such, execution of the CPU instruction 101 and/or one or more other CPU instructions can be scheduled based on real-time analysis of workload, temperature characteristics, and/or a number of virtual cores related to each of the execution units.

Additionally, in one or more embodiments, the control unit system 104 causes execution of the CPU instruction 101 via the particular execution unit. For example, the particular execution unit can be a performance execution unit for a performance core associated with workload characteristics greater than an efficiency execution unit. As such, the particular execution unit can execute the CPU instruction 101 according to the workload characteristics associated with performance processing. Alternatively, the particular execution unit can be an efficiency execution unit for an efficiency core with workload characteristics less than a performance execution unit. As such, the particular execution unit can alternatively execute the CPU instruction 101 according to the workload characteristics associated with efficiency processing. After being executed by the particular execution unit, a result for the CPU instruction 101 can be stored in the reorder buffer 108. Additionally, the control unit system 104 can utilize the result for the CPU instruction 101 to determine one or more dependencies with respect to one or more other CPU instructions to be executed via the set of execution units 106*a-n*. In certain embodiments, after being executed by the particular execution unit, a result for the CPU instruction 101 can be additionally or alternatively stored in at least one register of the one or more registers 111.

Figure 2:
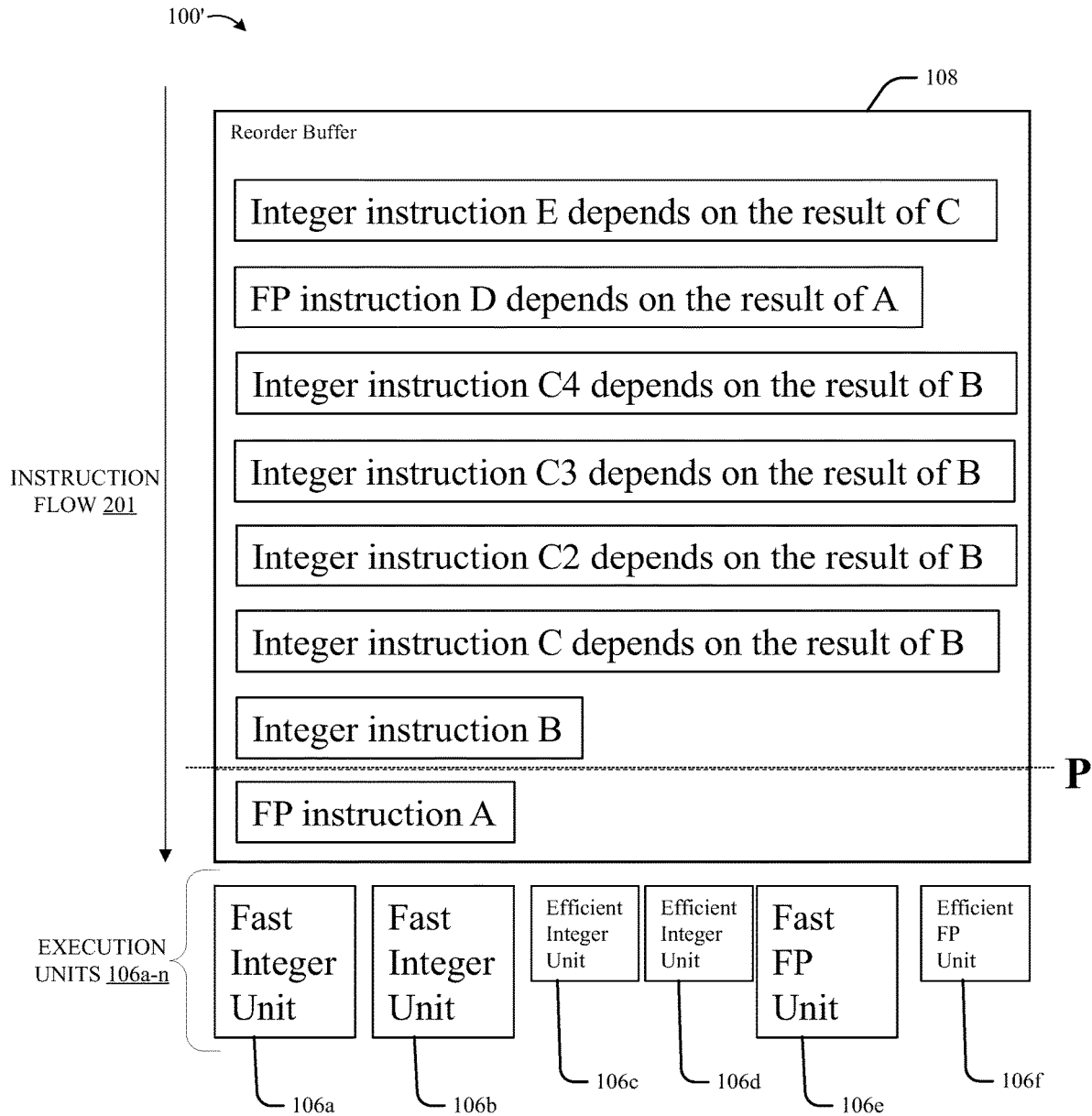
FIG. 2 illustrates an exemplary system for executing instructions, in accordance with one or more embodiments described herein.

FIG. 2 illustrates a system 100' that provides another exemplary environment according to one or more described features of one or more embodiments of the disclosure. The system 100' can be an embodiment of at least a portion of the system 100. According to one or more embodiments, the system 100' includes the set of execution units 106*a-n* and the reorder buffer 108.

In one or more embodiments, the reorder buffer 108 provides an instruction flow 201 for execution via one or more execution units from the set of execution units 106*a-n*. The instruction flow 201 can include a stream of instructions. For example, the instruction flow 201 can include a floating point (FP) instruction A, an integer instruction B, an integer instruction C that depends on the result of integer instruction B, an integer instruction C2 that depends on the result of integer instruction B, an integer instruction C3 that depends on the result of integer instruction B, an integer instruction C4 that depends on the result of integer instruction B, an FP instruction D that depends on the result of FP instruction A, and an integer instruction E that depends on the result of integer instruction C. In one or more embodiments, the integer instruction E can be a most recently received instruction by the reorder buffer 108 and the FP instruction A can be an oldest instruction received by the reorder buffer 108.

Based on the dependencies of the instructions mapped in the reorder buffer 108, the control unit system 104 can provide execution unit decisions with respect to the set of execution units 106*a-n*. In one or more embodiments, the FP instruction A can correspond to the CPU instruction 101 illustrated in FIG. 1. For example, the FP instruction A can be an instruction that has reached point P in the instruction flow 201 in which the control unit system 104 determines a particular execution unit from the set of execution units 106*a-n* to execute the FP instruction A. As such, the point P in the instruction flow 201 can be an execution unit selection stage for an instruction to determine which execution unit will execute the instruction (e.g., whether a slow but power-efficient execution will execute the instruction, or a fast execution unit that consumes more power will execute the instruction).

To determine the particular execution unit from the set of execution units 106*a-n*, the control unit system 104 can determine a next instruction that depends on results of the FP instruction A and/or how far the next instruction is located in the instruction flow 201 with respect to the FP instruction A. As such, if the next instruction is adequately separated from the FP instruction A in the instruction flow 201, an efficient execution unit (e.g., efficient integer unit 106*c*, efficient integer unit 106*d*, or efficient integer unit 106*f* from the set of execution units 106*a-n*) can be selected for the FP instruction A.

In a non-limiting example as illustrated in FIG. 2, since FP instruction D is adequately separated from the FP instruction A in the instruction flow 201 (e.g., FP instruction D is separated from the FP instruction A by a certain number of instructions such as 6 instructions), the control unit system 104 can schedule the FP instruction A to execute on an efficient execution unit (e.g., efficient integer unit 106*c*, efficient integer unit 106*d*, or efficient integer unit 106*f* from the set of execution units 106*a-n*) since, by the time the FP instruction A is finished being executed by the efficient execution unit, FP instruction D will still be waiting for execution of one or more other instructions ahead of FP instruction D in the instruction flow 201.

In another non-limiting example as illustrated in FIG. 2, in response to the integer instruction B arriving at point P in the instruction flow 201 (e.g., integer instruction B arriving at a selection stage for an execution unit), the control unit system 104 can determine a next instruction that depends on results of integer instruction B, which as illustrated in FIG. 2 is integer instruction C that is located in the instruction flow 201 immediately after the integer instruction B. As such, the control unit system 104 can schedule the integer instruction B to execute on a fast execution unit (e.g., fast integer unit 106a, fast integer unit 106b, or fast integer unit 106e from the set of execution units 106a-n). The fast execution unit can be a performance execution unit, for example.

In yet another non-limiting example as illustrated in FIG. 2, in response to the integer instruction C arriving at point P in the instruction flow 201 (e.g., integer instruction C arriving at a selection stage for an execution unit), the control unit system 104 can schedule the integer instruction C to execute on an efficient execution unit (e.g., efficient integer unit 106c, efficient integer unit 106d, or efficient integer unit 106f from the set of execution units 106a-n) since a first dependent instruction (e.g., integer instruction E) is adequately separated from the integer instruction C in the instruction flow 201 to allow execution of the integer instruction C via the efficient execution unit.

In yet another non-limiting example as illustrated in FIG. 2, the integer instruction C2, the integer instruction C3, and the integer instruction C4 can be scheduled for execution according to availability since the integer instruction C2, the integer instruction C3, and the integer instruction C4 have no instructions that depend on respective results of the integer instruction C2, the integer instruction C3, and the integer instruction C4. For instance, the integer instruction C2 and the integer instruction C3 can be executed via respective efficient execution units while the integer instruction C4 can be executed via a fast execution unit.

Returning back to FIG. 1, in one or more embodiments, the CPU 102 is integrated in a user device such as, but not limited to, a mobile device, a smartphone, a tablet computer, a handheld computer, a mobile computer, a laptop computer, a wearable device, a virtual reality device, an augmented reality device, or another type of user device. As such, the CPU instruction 101 can be related to data associated with a user device.

Figure 3:
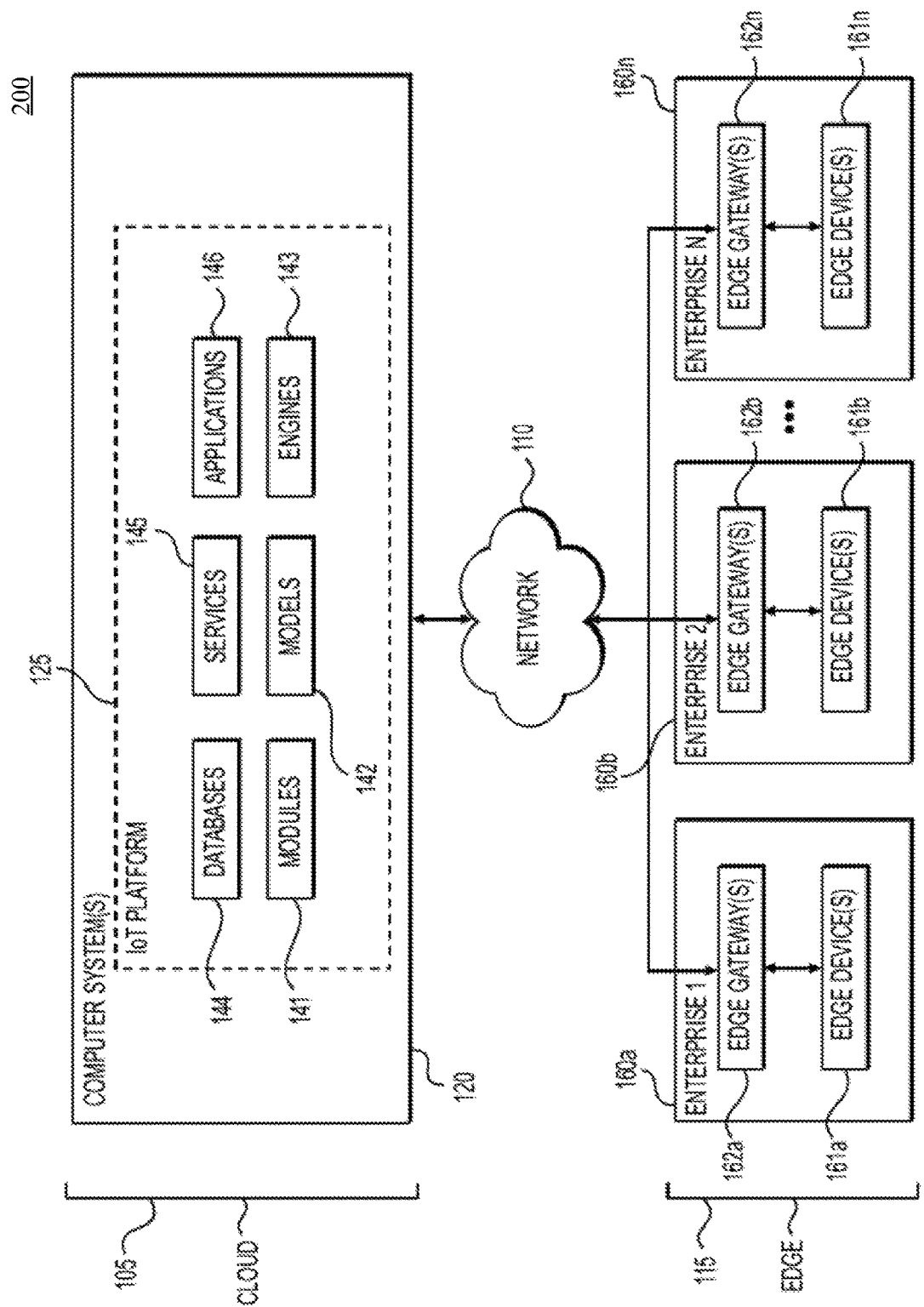
FIG. 3 illustrates an exemplary networked computing system environment, in accordance with one or more embodiments described herein.

In one or more other embodiments, the CPU 102 is integrated in a networked computing system. FIG. 3 illustrates an exemplary networked computing system environment 200 related to the CPU 102, according to one or more embodiments of the present disclosure. As shown in FIG. 3, networked computing system environment 200 is organized into a plurality of layers including a cloud 105, a network 110, and an edge 115. In one or more embodiments, the cloud 105 is a cloud layer, the network 110 is a network layer, and/or the edge 115 is an edge layer. As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 200 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 3. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device and should not be construed as limiting on the types of computing systems useable within IoT platform 125. The IoT platform 125 can be an extensible platform that is portable for deployment in any cloud or data center environment for providing an enterprise-wide, top to bottom view, displaying the status of processes, assets, people, and safety. Further, the IoT platform 125 can supports end-to-end capability to execute digital twins against process data and to translate the output into actionable insights.

In various embodiments, one or more of the computer systems 120 includes the CPU 102. In one embodiment, the CPU 102 is embodied in server-class hardware, such as enterprise-level servers. For example, in an embodiment, the CPU 102 is integrated into any type or combination of application servers, communication servers, web servers, super-computing servers, database servers, file servers, mail servers, proxy servers, and/virtual servers. Further, the CPU 102 can be configured to perform a plurality of functions of the networked computing system environment 200. In certain embodiments, the networked computing system environment 200 is an on-premise networked computing system where the edge 115 is configured as a process control network and the cloud 105 is configured as an enterprise network.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 4 below. According to various embodiments, the CPU 102 is configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/ or data storage and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 200 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider. In one or more embodiments, the CPU instruction 101 is associated with the received data.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

Figure 4:
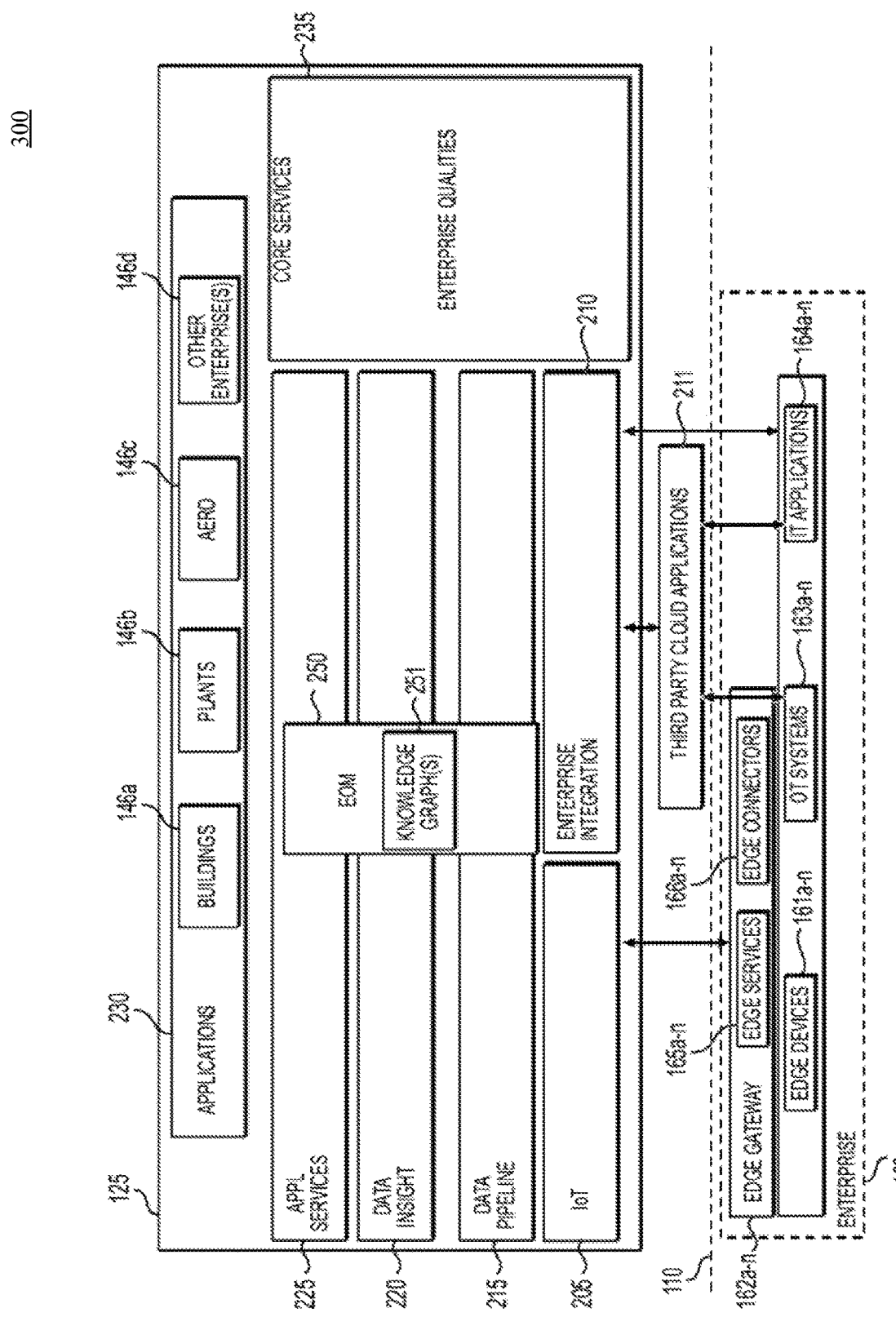
FIG. 4 illustrates a schematic block diagram of a framework of an IoT platform of the networked computing system, in accordance with one or more embodiments described herein.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include assets, sensors, actuators, processors, computers, valves, pumps, ducts, vehicle components, cameras, displays, doors, windows, security components, boilers, chillers, pumps, air handler units, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 4, in one or more embodiments, the edge 115 include operational technology (OT) systems 163a-163n and information technology (IT) applications 164a-164n of each enterprise 160a-160n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 3, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 4 illustrates a schematic block diagram of framework 300 of the IoT platform 125, according to the present disclosure. The IoT platform 125 of the present disclosure is a platform for enterprise performance management that uses real-time accurate models and visual analytics to deliver intelligent actionable recommendations and/or analytics for sustained peak performance of the enterprise 160a-160n.

The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 300, detailed further below.

As shown in FIG. 4, the framework 300 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added. In certain embodiments, the framework 300 can be an on-premise framework where the edge devices 161a-161n are configured as part of a process control network and the IoT platform 125 is configured as an enterprise network.

The IoT platform 125 is a model-driven architecture. Thus, the extensible object model 250 communicates with each layer 205-230 to contextualize site data of the enterprise 160a-160n using an extensible graph-based object model (or "asset model"). In one or more embodiments, the extensible object model 250 is associated with knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 includes a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a KPI framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior. In one or more embodiments, each of the key attribute contributing to one or more metrics to drive a dashboard is marked with one or more metric tags such that a dashboard visualization is generated.

The modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161a-161n and determine what the naming conventions refer to. For example, in one or more embodiments, the knowledge graph 251 receives "TMP" during the modeling phase and determine that "TMP" relates to "temperature." The generated models are then published. The complex onboarding process includes the knowledge graph 251 receiving the raw model data, receiving point history data, and receiving site survey data. According to various embodiments, the knowledge graph 251 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, in one or more embodiments, data is ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT platform 205. In some embodiments, only authorized data is sent to the IoT platform 125, and the IoT platform 125 only accepts data from authorized edge gateways 162a-162n and/or edge devices 161a-161n. According to various embodiments, data is sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third-party applications 211 rather than, or in combination with, receiving the data from the edge devices 161a-161n directly. In certain embodiments, the enterprise integration layer 210 enables a scalable architecture to expand interfaces to multiple systems and/or system configurations. In certain embodiments, the enterprise integration layer 210 enables integration with an indoor navigation system related to the enterprise 160a-160n.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161a-161n). For example, in an embodiment, a pump template defines pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161a-161n) instance is created, any associated calculation instances are also created with their input and output parameters linked to the appropriate attributes of the asset (e.g., edge device 161a-161n).

According to various embodiments, the IoT platform 125 supports a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition May have. There may be multiple fault models for a given enterprise 160a-160n looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about an optimal corrective action to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, process design is integrated with feed conditions and production requirement. Process changes and technology improvement provide opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161a-161n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146a-d. The applications layer 230 includes one or more applications 146a-d of the IoT platform 125. For example, according to various embodiments, the applications 146a-d includes a buildings application 146a, a plants application 146b, an aero application 146c, and other enterprise applications 146d. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance and asset health. According to various embodiments, autonomous control includes energy optimization and/or predictive maintenance. As detailed above, according to various embodiments, the general applications 146 is extensible such that each application 146 is configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/entitlements, logging/monitoring, usage metering, API gateway/dev portal, and the IoT platform 125 streams.

Figure 5:
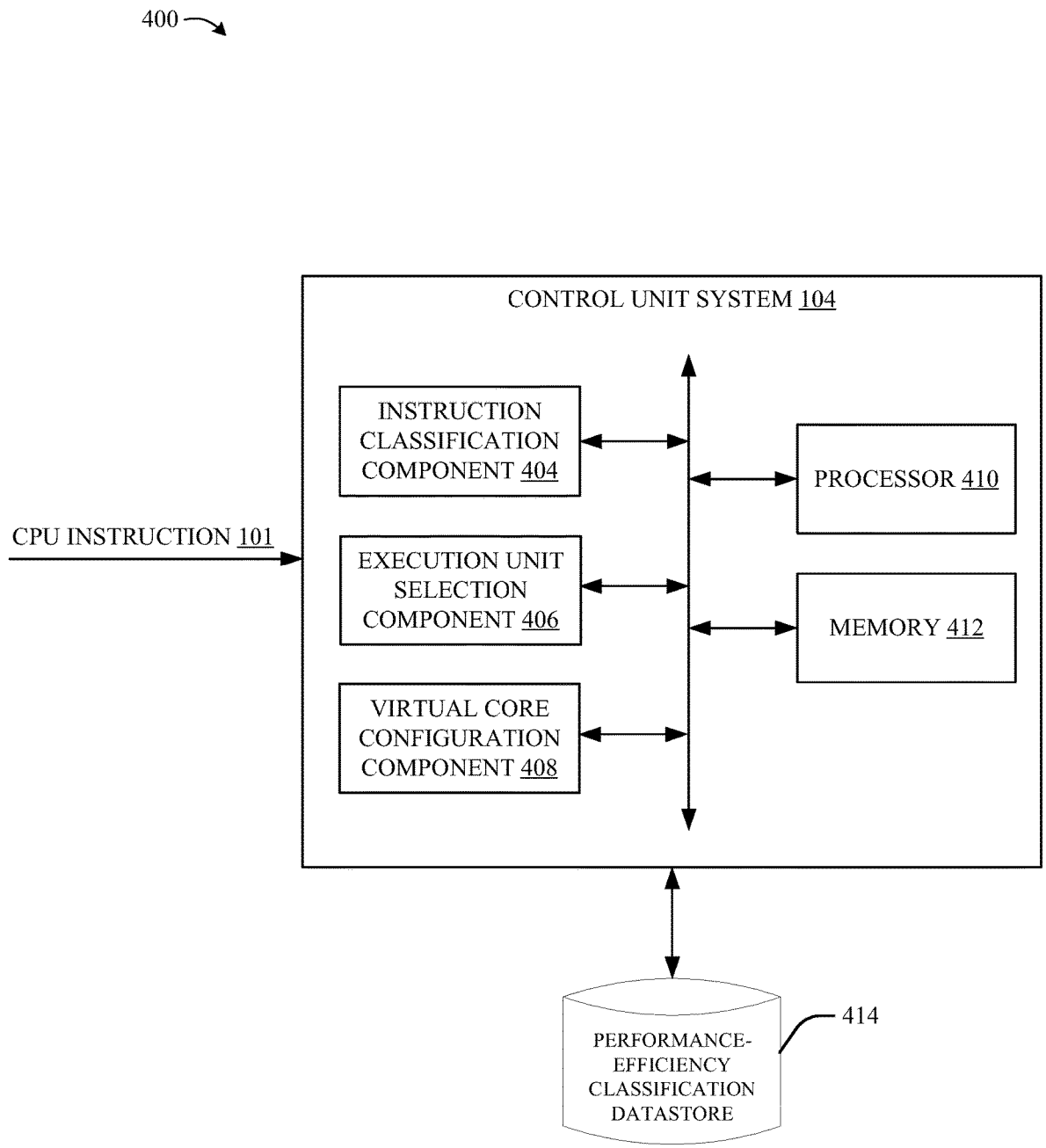
FIG. 5 illustrates an exemplary control unit system, in accordance with one or more embodiments described herein.

FIG. 5 illustrates a system 400 that provides another exemplary environment according to one or more described features of one or more embodiments of the disclosure. According to an embodiment, the system 400 includes a control unit system 104. In one or more embodiments, the control unit system 104 is associated with a mobile device, a smartphone, a tablet computer, a handheld computer, a mobile computer, a laptop computer, a wearable device, a virtual reality device, an augmented reality device, or another type of computing device. In one or more other embodiments, the control unit system 104 is associated with one or more application products such as a cloud platform, a data modeling platform, an asset management platform, an asset performance platform, a global operations platform, a site operations platform, an industrial asset platform, an industrial process platform, a digital worker platform, an energy and sustainability platform, a healthy buildings platform, an energy optimization platform, a predictive maintenance platform, a centralized control platform, and/or another type of asset platform.

The control unit system 104 includes an instruction classification component 404, an execution unit selection component 406, and/or a virtual core configuration component 408. Additionally, in one or more embodiments, the control unit system 104 includes a processing component 410, and/or a memory 412. In certain embodiments, one or more aspects of the control unit system 104 (and/or other systems, apparatuses and/or processes disclosed herein) constitute executable instructions embodied within a computer-readable storage medium (e.g., the memory 412). For instance, in an embodiment, the memory 412 stores computer executable component and/or executable instructions (e.g., program instructions). Furthermore, the processing component 410 facilitates execution of the computer executable components and/or the executable instructions (e.g., the program instructions). In an example embodiment, the processing component 410 is configured to execute instructions stored in the memory 412 or otherwise accessible to the processing component 410.

The processing component 410 is a hardware entity (e.g., physically embodied in circuitry such as, for example, the CPU 102) capable of performing operations according to one or more embodiments of the disclosure. Alternatively, in an embodiment where the processing component 410 is embodied as an executor of software instructions, the software instructions configure the processing component 410 to perform one or more algorithms and/or operations described herein in response to the software instructions being executed. In an embodiment, the processing component 410 is a single core processor, a multi-core processor, multiple processors internal to the control unit system 104, a remote processor (e.g., a processor implemented on a server), and/or a virtual machine. In certain embodiments, the processing component 410 is in communication with the instruction classification component 404, the execution unit selection component 406, the virtual core configuration component 408, and/or the memory 412 via a bus to, for example, facilitate transmission of data among the instruction classification component 404, the execution unit selection component 406, the virtual core configuration component 408, and/or the memory 412. The processing component 410 may be embodied in a number of different ways and, in certain embodiments, includes one or more processing components configured to perform independently. Additionally or alternatively, in one or more embodiments, the processing component 410 includes one or more processor cores and/or one or more processing units configured in tandem via a bus to enable independent execution of instructions, pipelining of data, and/or multi-thread execution of instructions.

The memory 412 is non-transitory and includes, for example, one or more volatile memories and/or one or more non-volatile memories. In other words, in one or more embodiments, the memory 412 is an electronic storage device (e.g., a computer-readable storage medium). The memory 412 is configured to store information, data, content, one or more applications, one or more instructions, or the like, to enable control unit system 104 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on the CPU 102, a processor or a portion of a processor such as the CPU 102, circuitry, an executable component, a thread of instructions, a program, and/or a computer entity.

In one or more embodiments, the CPU instruction 101 can be provided to the instruction classification component 404, the execution unit selection component 406, and/or the memory 412 for processing, decrypting, and/or compiling. Once the event data structure 306 has been processed, decrypted, and/or compiled (e.g., as by the instruction classification component 404, the execution unit selection component 406, and/or the virtual core configuration component 408), the CPU instruction 101 can be provided to a particular execution unit from the set of execution units 106*a-n*.

In one or more embodiments, the instruction classification component 404 embodies executable computer program code, one or more computer programs, one or more executable instructions, one or more computer processes, and/or computer hardware configured to analyze and/or process the CPU instruction 101. For example, the instruction classification component 404 can determine a performance-efficiency classification for the CPU instruction 101 based on an instruction dependency between the CPU instruction 101 and one or more other CPU instructions that depend on the CPU instruction 101.

In one or more embodiments, the instruction classification component 404 can determine the performance-efficiency classification for the CPU instruction 101 based on a number of CPU instructions in an instruction workflow between the CPU instruction 101 and the one or more other CPU instructions that depend on the CPU instruction 101. In certain embodiments, the CPU instruction 101 can include a tag, a flag, one more bits, and/or another type of indicator to identify instruction dependencies and/or other instruction workflow attributes such as a number of CPU instructions in an instruction workflow between the CPU instruction 101 and the one or more other CPU instructions that depend on the CPU instruction 101. In one or more embodiments, the instruction classification component 404 can determine the performance-efficiency classification for the CPU instruction 101 based on a comparison between the number of CPU instructions and a threshold number of CPU instructions that differentiates a performance classification and an efficiency classification for CPU instructions. For example, the threshold number of CPU instructions can be a defined number of CPU instructions that differentiates a performance classification and an efficiency classification for CPU instructions. In one or more embodiments, in response to the number of CPU instructions satisfying (e.g., being equal to or higher than) the threshold number of CPU instructions, the instruction classification component 404 can classify the CPU instruction 101 as an efficiency classification where the CPU instruction 101 can be scheduled for execution via an efficiency execution unit of the set of execution units 106*a-n*. In another example, in response to the number of CPU instructions not satisfying (e.g., being less than) the threshold number of CPU instructions, the instruction classification component 404 can classify the CPU instruction 101 as a performance classification where the CPU instruction 101 can be scheduled for execution via a performance execution unit of the set of execution units 106a-n.

In one or more embodiments, the instruction classification component 404 can additionally or alternatively determine the performance-efficiency classification for the CPU instruction 101 based on a classification model configured and/or trained for performance-efficiency classification related to CPU instructions. The classification model can be a machine learning model, a neural network model, a deep learning model, or another type of classification configured to provide predictions, inferences, and/or classifications related to performance-efficiency characteristics for CPU instructions.

In one or more embodiments, the execution unit selection component 406 embodies executable computer program code, one or more computer programs, one or more executable instructions, one or more computer processes, and/or computer hardware configured to route the CPU instruction 101 to a particular execution unit from the set of execution units 106a-n. For example, the execution unit selection component 406 can determine a particular execution unit from the set of execution units 106a-n that comprises a defined performance-efficiency classification corresponding to the performance-efficiency classification associated with the CPU instruction 101. Additionally or alternatively, the execution unit selection component 406 can cause execution of the CPU instruction 101 via the particular execution unit from the set of execution units 106a-n. In one or more embodiments, the defined performance-efficiency classification for respective execution unit from the set of execution units 106a-n can be accessed via a performance-efficiency classification datastore 414 communicatively coupled to the control unit system 104. For example, the performance-efficiency classification datastore 414 can store respective defined performance-efficiency classifications for respective execution unit from the set of execution units 106a-n. Accordingly, the execution unit selection component 406 can query the performance-efficiency classification datastore 414 to determine whether the performance-efficiency classification associated with the CPU instruction 101 matches a defined performance-efficiency classification for a particular execution unit from the set of execution units 106a-n. In certain embodiments, the performance-efficiency classification datastore 414 can correspond to at least a portion of the memory 412.

In one or more embodiments, the virtual core configuration component 408 embodies executable computer program code, one or more computer programs, one or more executable instructions, one or more computer processes, and/or computer hardware configured to modify configuration of a virtual core and/or a particular execution unit from the set of execution units 106a-n that is related to a virtual core. For example, the virtual core configuration component 408 can tune one or more virtual cores and/or one or more related execution units from the set of execution units 106a-n based on the performance-efficiency classification associated with the CPU instruction 101. The instruction classification component 404, the execution unit selection component 406, and/or the virtual core configuration component 408 can additionally or alternatively perform one or more other aspects of the control unit system 104, as more fully disclosed herein.

In one or more embodiments, the control unit system 104 (e.g., the instruction classification component 404 of the control unit system 104) determines and/or receives the CPU instruction 101. In certain embodiments, the CPU instruction 101 can include data generated by and/or received from a mobile device, a smartphone, a tablet computer, a handheld computer, a mobile computer, a laptop computer, a wearable device, a virtual reality device, an augmented reality device, or another type of computing device. Additionally or alternatively, in certain embodiments, the CPU instruction 101 can include data received via the network 110. In certain embodiments, the data associated with the CPU instruction 101 can be received via the network 110 in response to a network connection being established between the a device and the network 110.

In one or more embodiments, the data associated with the CPU instruction 101 is related to the edge devices 161a-161n. In one or more embodiments, the edge devices 161a-161n are associated with a portfolio of assets. For instance, in one or more embodiments, the edge devices 161a-161n include one or more assets in a portfolio of assets. The edge devices 161a-161n include, in one or more embodiments, one or more databases, one or more assets (e.g., one or more machines, equipment, one or more tools, one or more industrial assets, one or more warehouse assets, one or more building assets, etc.), one or more IoT devices (e.g., one or more industrial IoT devices), one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more vehicle components, one or more cameras, one or more displays, one or more security components, one or more air handler units, one or more HVAC components, industrial equipment, factory equipment, and/or one or more other devices that are connected to the network 110 for collecting, sending, and/or receiving information. In one or more embodiments, the edge device 161a-161n include, or is otherwise in communication with, one or more controllers for selectively controlling a respective edge device 161a-161n and/or for sending/receiving information between the edge devices 161a-161n and the control unit system 104 via the network 110. In one or more embodiments, the data associated with the CPU instruction 101 (e.g., the data associated with the edge devices 161a-161n) includes, for example, industrial asset data, asset data related to asset properties, asset configuration data, operational functionality data, sensor data, real-time data, live property value data, event data, warehouse data, packing/unpacking event data, process data, operational data, operational limit values, fault data, location data, and/or other data associated with the edge devices 161a-161n.

In certain embodiments, at least one edge device from the edge devices 161a-161n incorporates encryption capabilities to facilitate encryption of one or more portions of the asset data. Additionally, in one or more embodiments, the control unit system 104 receives the data associated with the edge devices 161a-161n via the network 110. In one or more embodiments, the network 110 is a Wi-Fi network, an NFC network, a WiMAX network, a PAN, a short-range wireless network (e.g., a Bluetooth® network), an infrared wireless (e.g., IrDA) network, a UWB network, an induction wireless transmission network, and/or another type of network. In one or more embodiments, the edge devices 161a-161n are associated with an operational environment (e.g., an industrial environment, a manufacturing environment, a process environment, a warehouse environment, a manufacturing site, a processing site, a plant, etc.). Additionally or alternatively, in one or more embodiments, the edge devices 161a-161n are associated with components of the edge 115 such as, for example, one or more enterprises 160a-160n.

Figure 6:
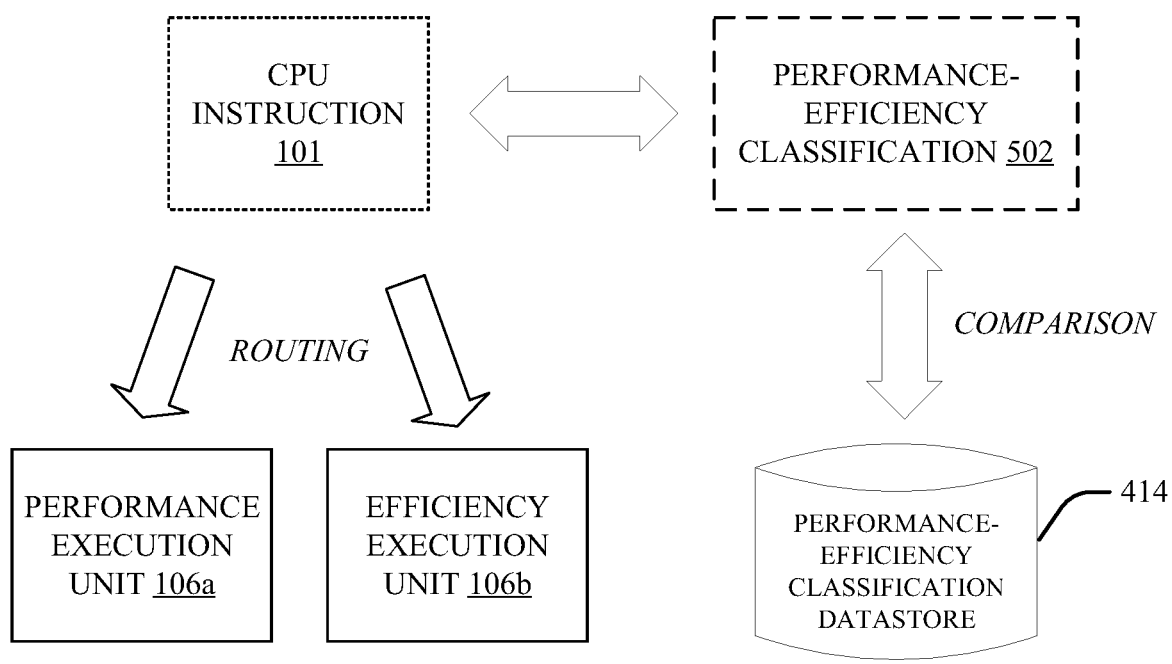
FIG. 6 illustrates an exemplary system associated with routing of a CPU instruction to a performance execution unit or an efficiency execution unit, in accordance with one or more embodiments described herein.

FIG. 6 illustrates a system 500 that provides an exemplary environment according to one or more described features of one or more embodiments of the disclosure. According to one or more embodiments, the system 500 includes a performance execution unit 106a and an efficiency execution unit 106b from the set of execution units 106a-n. In one or more embodiments, a performance-efficiency classification 502 is determined for the CPU instruction 101 to facilitate routing of the CPU instruction 101 to either the performance execution unit 106a or the efficiency execution unit 106b based on the performance-efficiency classification 502. For example, the performance-efficiency classification 502 can be compared to respective defined performance-efficiency classifications for at least the performance execution unit 106a and the efficiency execution unit 106b. The respective defined performance-efficiency classifications for at least the performance execution unit 106a and the efficiency execution unit 106b can be stored in the performance-efficiency classification datastore 414. In one or more embodiments, the performance-efficiency classification datastore 414 can be queried and based on a match between the performance-efficiency classification 502 and a particular defined performance-efficiency classifications for the performance execution unit 106a or the efficiency execution unit 106b, the CPU instruction 101 can be routed to either the performance execution unit 106a or the efficiency execution unit 106b for execution. In one or more embodiments, the performance-efficiency classification datastore 414 can additionally or alternatively store one or more thresholds (e.g., a threshold number of CPU instructions that differentiates a performance classification and an efficiency classification for CPU instructions) to facilitate determination of the performance-efficiency classification 502 for the CPU instruction 101.

Figure 7:
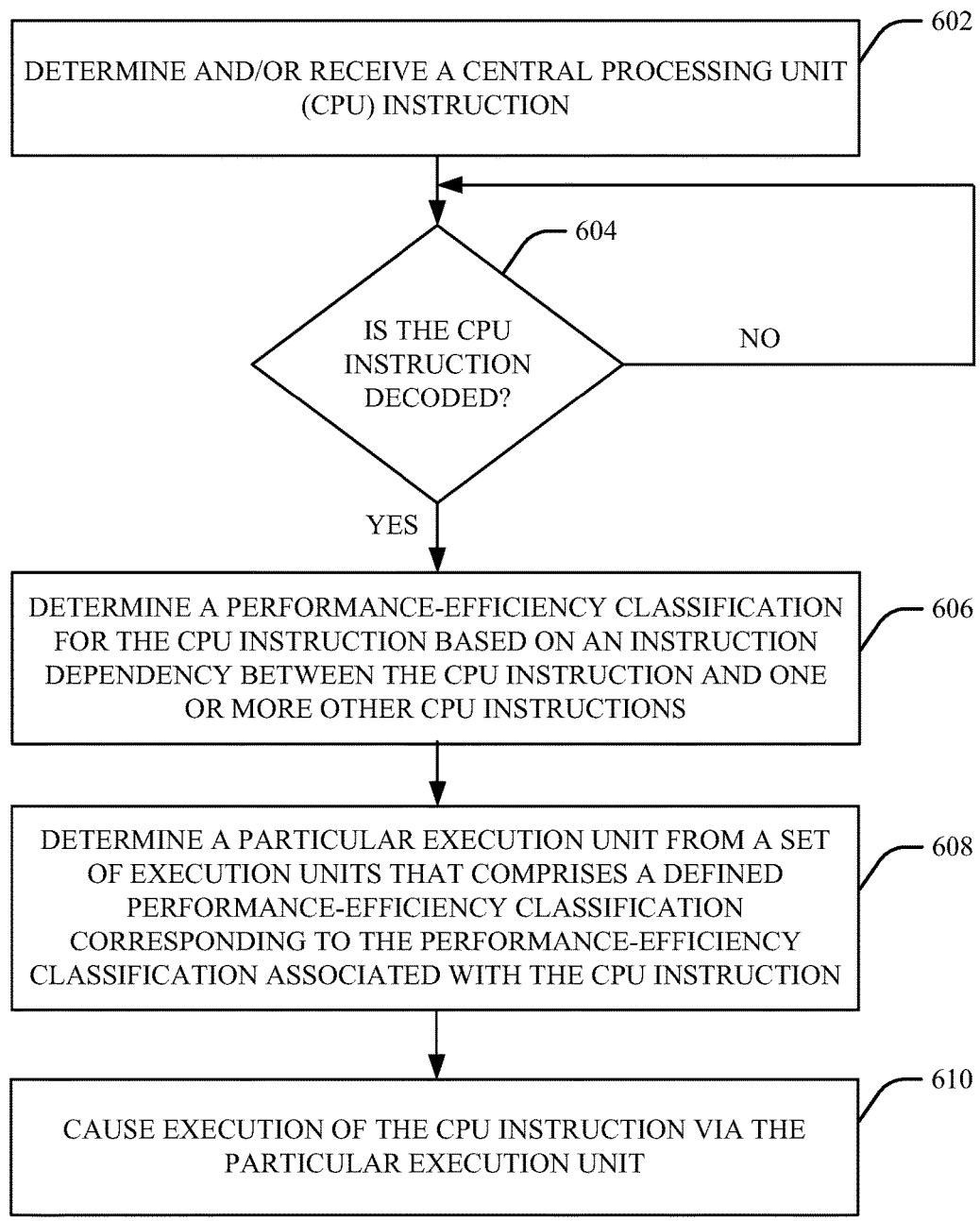
FIG. 7 illustrates a process flow diagram for optimizing CPU instruction flows based on performance-efficiency classifications for CPU instructions, in accordance with one or more embodiments described herein.

FIG. 7 illustrates a process flow diagram for optimizing CPU instruction flows based on performance-efficiency classifications for CPU instructions, in accordance with one or more embodiments described herein. In one or more embodiments, the method 600 is associated with the control unit system 104. In one or more embodiments, the method 600 begins at step 602 that determines and/or receives (e.g., by the instruction classification component 404) a CPU instruction.

At block 604, it is determined whether the CPU instruction is decoded. For example, it can be determined whether a CPU (e.g., the control unit system 104) has fetched and/or decoded the CPU instruction. If no, block 604 is repeated until the CPU instruction is decoded. If yes, the method 600 proceeds to block 606. In response to the CPU instruction, the method 600 includes a block 606 that determines (e.g., by the instruction classification component 404) a performance-efficiency classification for the CPU instruction based on an instruction dependency between the CPU instruction and one or more other CPU instructions. The instruction dependency can be based on an instruction flow and/or output data provided by a reorder buffer. In one or more embodiments, the instruction dependency is based on a number of CPU instructions in an instruction workflow between the CPU instruction and the one or more other CPU instructions. For example, the performance-efficiency classification for the CPU instruction can be determined based on a comparison between the number of CPU instructions and a threshold number of CPU instructions that differentiates a performance classification and an efficiency classification for CPU instructions.

In response to the CPU instruction, the method 600 additionally or alternatively includes a block 808 that determines (e.g., by the execution unit selection component 406) a particular execution unit from a set of execution units that comprises a defined performance-efficiency classification corresponding to the performance-efficiency classification associated with the CPU instruction. For example, in response to the particular execution unit being classified with a performance classification, the particular execution unit can be a performance execution unit for a performance core associated with workload characteristics greater than an efficiency execution unit. Alternatively, in response to the particular execution unit being classified with an efficiency classification, the particular execution unit can be an efficiency execution unit for an efficiency core with workload characteristics less than a performance execution unit.

In certain embodiments, the particular execution unit from the set of execution units can be additionally or alternatively determined based on a virtual core identifier for the CPU instruction. For example, the CPU instruction can be tagged with a particular virtual core identifier based on one or more instruction dependencies between the CPU instruction and one or more other CPU instructions. In certain embodiments, the particular execution unit from the set of execution units can be additionally or alternatively determined based on a respective performance counter for the set of execution units. For example, scheduling of the CPU instruction for execution by the particular execution unit can be accepted or denied based on a performance counter for the particular execution unit.

In response to the CPU instruction, the method 600 additionally or alternatively includes a block 610 that causes (e.g., by the execution unit selection component 406 and/or an execution unit of the set of execution units 106a-n) execution of the CPU instruction via the particular execution unit.

In one or more embodiments, the method 600 can additionally or alternatively tune workload for the set of execution units based on the performance-efficiency classification associated with the CPU instruction.

Figure 8:
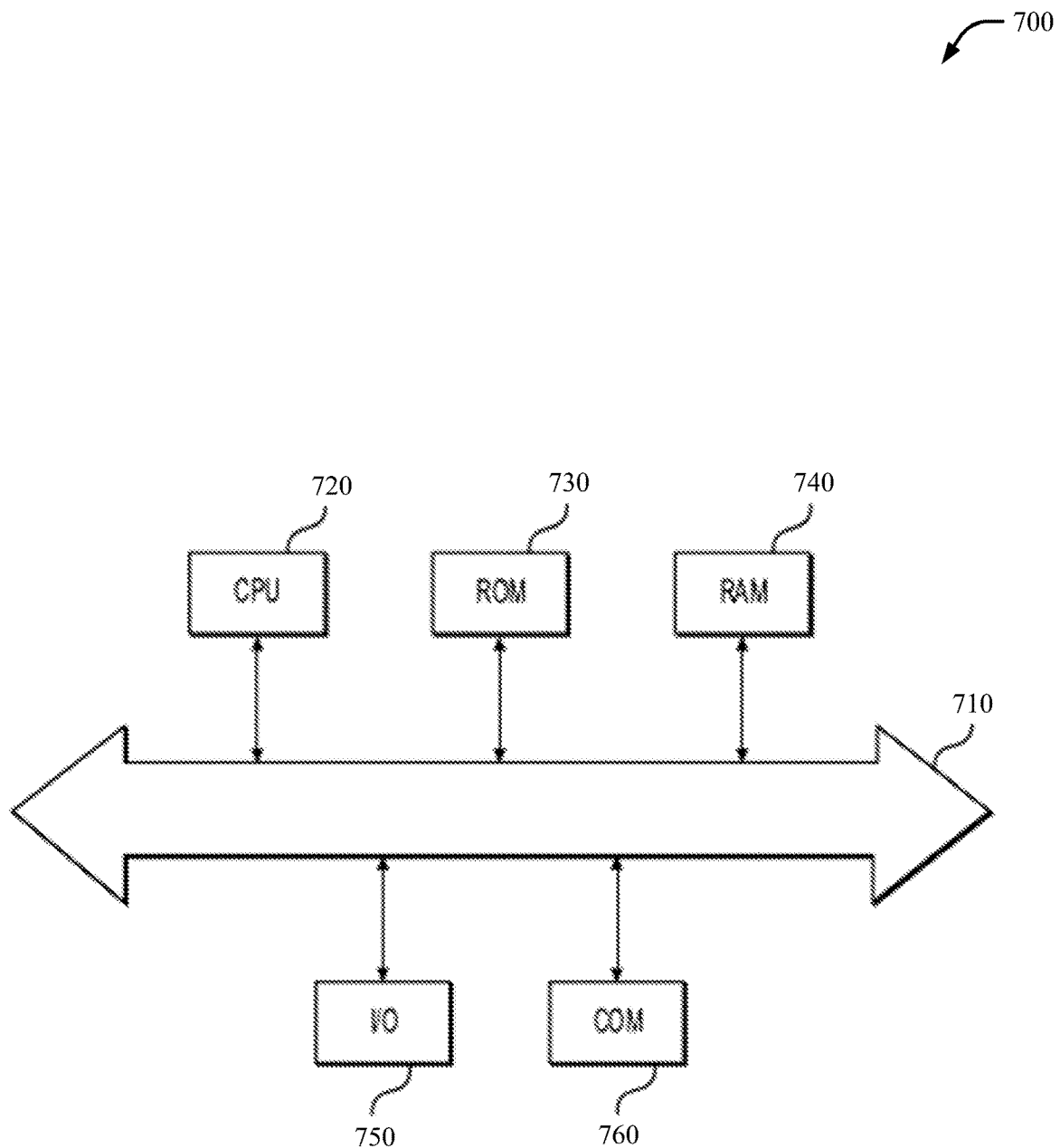
FIG. 8 illustrates a functional block diagram of a computer that may be configured to execute techniques described in accordance with one or more embodiments described herein.

FIG. 8 depicts an example system 700 that may execute techniques presented herein. FIG. 8 is a simplified functional block diagram of a computer that may be configured to execute techniques described herein, according to exemplary embodiments of the present disclosure. Specifically, the computer (or "platform" as it may not be a single physical computer infrastructure) may include a data communication interface 760 for packet data communication. The platform also may include a central processing unit ("CPU") 720, in the form of one or more processors, for executing program instructions. In one or more embodiments, the CPU 702 corresponds to the CPU 102. The platform may include an internal communication bus 710, and the platform also may include a program storage and/or a data storage for various data files to be processed and/or communicated by the platform such as ROM 730 and RAM 740, although the system 700 may receive programming and data via network communications. The system 700 also may include input and output ports 750 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VOIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an ASIC or FPGA, a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
one or more processors;
a memory; and
one or more programs stored in the memory, the one or more programs comprising instructions configured to:
determine a performance-efficiency classification for a central processing unit (CPU) instruction based on an instruction dependency between the CPU instruction and one or more other CPU instructions, wherein the instruction dependency is based on a number of CPU instructions in an instruction workflow between the CPU instruction and the one or more other CPU instructions;
determine a particular execution unit from a set of execution units that comprises a defined performance-efficiency classification corresponding to the performance-efficiency classification associated with the CPU instruction; and
cause execution of the CPU instruction via the particular execution unit.

2. The system of claim 1, the one or more programs further comprising instructions configured to:
determine the instruction dependency based on output data provided by a reorder buffer.

3. The system of claim 1, the one or more programs further comprising instructions configured to:
determine the performance-efficiency classification for the CPU instruction based on a comparison between the number of CPU instructions and a threshold number of CPU instructions that differentiates a performance classification and an efficiency classification for CPU instructions.

4. The system of claim 1, wherein the particular execution unit is a performance execution unit for a performance core associated with workload characteristics greater than an efficiency execution unit.

5. The system of claim 1, wherein the particular execution unit is an efficiency execution unit for an efficiency core with workload characteristics less than a performance execution unit.

6. The system of claim 1, the one or more programs further comprising instructions configured to:
tune workload for the set of execution units based on the performance-efficiency classification associated with the CPU instruction.

7. The system of claim 1, the one or more programs further comprising instructions configured to:
determine the particular execution unit from the set of execution units based on a virtual core identifier for the CPU instruction.

8. The system of claim 1, the one or more programs further comprising instructions configured to:
determine the particular execution unit from the set of execution units based on a respective performance counter for the set of execution units.

9. A computer-implemented method, the method comprising:
determining a performance-efficiency classification for a central processing unit (CPU) instruction based on an instruction dependency between the CPU instruction and one or more other CPU instructions, wherein the instruction dependency is based on a number of CPU instructions in an instruction workflow between the CPU instruction and the one or more other CPU instructions;
determining a particular execution unit from a set of execution units that comprises a defined performance-efficiency classification corresponding to the performance-efficiency classification associated with the CPU instruction; and
causing execution of the CPU instruction via the particular execution unit.

10. The computer-implemented method of claim 9, further comprising:
determining the instruction dependency based on output data provided by a reorder buffer.

11. The computer-implemented method of claim 9, wherein determining the performance-efficiency classification for the CPU instruction comprises determining the performance-efficiency classification for the CPU instruction based on a comparison between the number of CPU instructions and a threshold number of CPU instructions that differentiates a performance classification and an efficiency classification for CPU instructions.

12. The system of claim 1, wherein the particular execution unit is a performance execution unit for a performance core associated with workload characteristics greater than an efficiency execution unit.

13. The system of claim 1, wherein the particular execution unit is an efficiency execution unit for an efficiency core with workload characteristics less than a performance execution unit.

14. The computer-implemented method of claim 9, further comprising:
tuning workload for the set of execution units based on the performance-efficiency classification associated with the CPU instruction.

15. The computer-implemented method of claim 9, further comprising:
determining the particular execution unit from the set of execution units based on a virtual core identifier for the CPU instruction.

16. The computer-implemented method of claim 9, further comprising:
determining the particular execution unit from the set of execution units based on a respective performance counter for the set of execution units 106.

17. A computer program product comprising at least one computer-readable storage medium having program instructions embodied thereon, the program instructions executable by a processor to cause the processor to:
determine a performance-efficiency classification for a central processing unit (CPU) instruction based on an instruction dependency between the CPU instruction and one or more other CPU instructions, wherein the instruction dependency is based on a number of CPU instructions in an instruction workflow between the CPU instruction and the one or more other CPU instructions;
determine a particular execution unit from a set of execution units that comprises a defined performance-efficiency classification corresponding to the performance-efficiency classification associated with the CPU instruction; and
cause execution of the CPU instruction via the particular execution unit.

18. The computer program product of claim 17, wherein the particular execution unit is a performance execution unit for a performance core associated with workload characteristics greater than an efficiency execution unit.

19. The computer program product of claim 17, wherein the particular execution unit is an efficiency execution unit for an efficiency core with workload characteristics less than a performance execution unit.

20. The computer program product of claim 17, wherein the program instructions further cause the processor to:
determine the performance-efficiency classification for the CPU instruction based on a comparison between the number of CPU instructions and a threshold number of CPU instructions that differentiates a performance classification and an efficiency classification for CPU instructions.

* * * * *